United States Patent
Gray

(10) Patent No.: US 9,317,669 B1
(45) Date of Patent: Apr. 19, 2016

(54) VERIFYING OWNERSHIP OF CONTENT

(75) Inventor: Douglas R. Gray, Mountain View, CA (US)

(73) Assignee: A9.com, Inc., Palo Alto, CA (US)

( * ) Notice: Subject to any disclaimer, the term of this patent is extended or adjusted under 35 U.S.C. 154(b) by 301 days.

(21) Appl. No.: 13/364,175

(22) Filed: Feb. 1, 2012

(51) Int. Cl.
| G06F 21/00 | (2013.01) |
| G06F 21/31 | (2013.01) |
| G06F 21/62 | (2013.01) |
| G06Q 20/32 | (2012.01) |

(52) U.S. Cl.
CPC ............ G06F 21/31 (2013.01); G06F 21/6209 (2013.01); *G06F 21/6218* (2013.01); *G06F 2221/2111* (2013.01); *G06Q 20/3223* (2013.01); *G06Q 20/3224* (2013.01)

(58) Field of Classification Search
USPC ............................. 726/29; 345/619, 625, 634; 707/748–755, 722–735; 455/456.1, 455/456, 457
See application file for complete search history.

(56) References Cited

U.S. PATENT DOCUMENTS

| 6,438,375 B1* | 8/2002 | Muller ........................ 455/435.3 |
| 7,872,593 B1* | 1/2011 | Rauscher et al. ............. 340/933 |
| 8,508,332 B2* | 8/2013 | Jones et al. .................... 340/5.2 |
| 8,572,696 B1* | 10/2013 | Wiacek ................... H04W 4/02 380/247 |
| 8,832,792 B2* | 9/2014 | Mikan ............................... 726/3 |
| 2005/0096938 A1* | 5/2005 | Slomkowski et al. ............ 705/1 |
| 2006/0240862 A1* | 10/2006 | Neven et al. ............... 455/550.1 |
| 2007/0043810 A1* | 2/2007 | Dionne ......................... 709/203 |
| 2009/0077129 A1* | 3/2009 | Blose ......................... 707/104.1 |
| 2011/0256884 A1* | 10/2011 | Kazmi et al. ............... 455/456.1 |
| 2011/0267492 A1* | 11/2011 | Prentice ................... G03B 7/08 348/223.1 |
| 2012/0176509 A1* | 7/2012 | Aravamudan et al. ..... 348/231.3 |
| 2012/0197688 A1* | 8/2012 | Townshend et al. ......... 705/14.1 |
| 2012/0230539 A1* | 9/2012 | Calman et al. ................ 382/103 |
| 2013/0091042 A1* | 4/2013 | Shah ...................... G06Q 40/02 705/35 |
| 2013/0159519 A1* | 6/2013 | Hochberg et al. ............. 709/225 |

* cited by examiner

Primary Examiner — Mohammad A Siddiqi

(57) ABSTRACT

Systems and methods of verifying ownership of content can receive and process requests for access to digital content associated with the items. Verifying ownership of content can include receiving, from a device, an image of a first portion of an item. The item can be a book, music disc, movie disc, software disc, or other item having associated digital content. The current location of the device can be transmitted with the image to verify that the device is not in a prohibited location. A comparison of the image received from the device and the current location of the device to verification data associated with the requested digital content can be processed to verify ownership of the physical item. Upon verifying ownership, access to digital content associated with the physical item can be granted on a permanent basis or a temporary basis.

20 Claims, 7 Drawing Sheets

VERIFYING OWNERSHIP OF CONTENT

BACKGROUND

Various types of electronic devices, such as personal computer, smartphones, electronic tables, electronic readers, portable media players, cellular phones, personal digital assistants (PDAs), and Blackberry® devices, are available to transmit and/or receive various information over wired and/or wireless connections. These devices can store and process an increasing amount of information, including digital books, digital music, and digital movies. The digital media can be purchased from e-commerce stores and downloaded on to the electronic devices. In most instances, purchasing a physical copy of the book, music, or movie provides the user with rights or access to that physical copy, but does not provide rights to other versions of the content. Customers who have physical copies of books, music, or movies can sometimes desire a digital copy thereof as well. Such customers typically will have to purchase a digital copy of the media in addition to the physical copy of the media.

BRIEF DESCRIPTION OF THE DRAWINGS

Various embodiments in accordance with the present disclosure will be described with reference to the drawings, in which.

DETAILED DESCRIPTION

Figure 1:
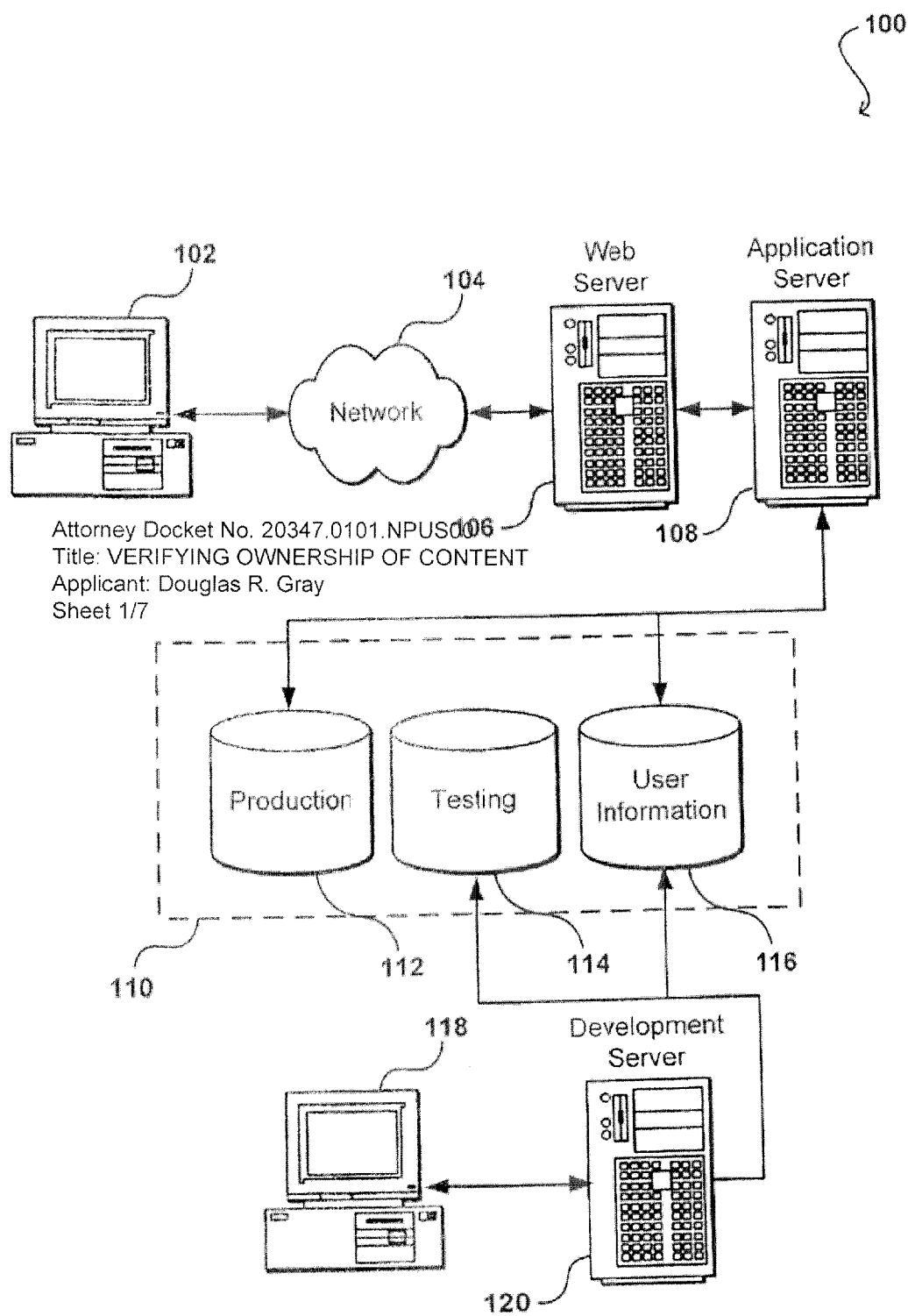
FIG. 1 illustrates an environment in which various embodiments can be implemented.

Systems and methods in accordance with various embodiments of the present disclosure may overcome one or more of the aforementioned and other deficiencies experienced in conventional approaches to providing digital content to a device. In particular, various embodiments provide for verifying ownership of items to provide digital content to a device.

As digital technology continues to expand and evolve, digital copies of physical books, music, movies, software, and other media are increasing. Traditionally, customers who have purchased the physical copies of the media in the past have had to also purchase digital copies. Some physical items now come with a digital copy or access to a digital copy of the item. However, for physical items purchased previously, customers must either purchase another physical item that includes the digital copy or must purchase a separate digital copy. Various systems and methods for verifying ownership described herein allow customers who have previously purchased physical items to access digital copies of those physical items.

In one embodiment of the present disclosure, a computer-implemented method for verifying ownership of content can include receiving, from a device having a camera, an image of a first portion of an item. An item can include a book, music disc, movie disc, software disc, or other item which can have associated digital content or which can have a digital version or copy thereof. For example, an image of a cover of a book that includes the title of the book can be received, thereby indicating for which book digital content is requested. The current location of the device transmitting the image can be determined to verify that the device is not in a bookstore, retail store, library, or other location where items may be purchased and images of items may be obtained to fraudulently claim ownership of the items. Based on the image received, verification data associated with the book pictured in the image can be retrieved. A request can be sent to the device for additional information to verify ownership of the device. For example, a request for a second image of a second portion of the item and a third image of a third portion of the item. The requested second image can be of a randomly selected page of the book. The requested third image can be another randomly selected page of the book. In other embodiments, the second image and third image can be of a barcode on the back of the book, a title page of the book, or other portion of the book. The requested second image and third image can be retrieved and compared to the verification data. For example, the verification data can include images of physical pages of the book for which digital content is request and images of pages of the digital copy of the book. If the images received from the device match, by a matching threshold, the verification data and the current location of the device is at a location that is not a prohibited location, access to digital content associated with the physical item can be granted. For example, if at least 85% of the content in the images received by the device matches content of the verification data, physical possession of the item and ownership of the content associated therewith can be verified. In another example, if at least a predetermined number of images and information received from the device is identical to the verification data, physical possession of the item and ownership of the content therein can be verified. Then, access to the digital content can be granted. Other embodiments and implementations of the systems and methods of verifying information will be described in further detail below and will reference FIGS. 1-8.

FIG. 1 illustrates an example of an environment 100 for implementing aspects in accordance with various embodiments. As will be appreciated, although a Web-based environment is used for purposes of explanation, different environments may be used, as appropriate, to implement various embodiments. An electronic client device 102 can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a plurality of resources, servers, hosts, instances, routers, switches, data stores, and/or other such components defining what will be referred to herein as a data plane 110, although it should be understood that resources of this plane are not limited to storing and providing access to data. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides admission control services in cooperation with the data store, and is able to generate content such as text, graphics, audio, and/or video to be transferred to the user, which may be served to the user by the Web server in the form of HTML, XML, or another appropriate structured language in this example. In some embodiments, the Web server 106, application server 108 and similar components can be considered to be part of the data plane. The handling of all requests and responses, as well as the delivery of content between the client device 102 and the application server 108, can be handled by the Web server. It should be understood that the Web and application servers are not required and are merely example components, as structured code can be executed on any appropriate device or host machine as discussed elsewhere herein.

The data stores of the data plane 110 can include several separate data tables, databases, or other data storage mechanisms and media for storing data relating to a particular aspect. For example, the data plane illustrated includes mechanisms for storing production data 112 and user information 116, which can be used to serve content for the production side. The data plane also is shown to include a mechanism for storing log data 114, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane 110. The data plane 110 is operable, through logic associated therewith, to receive instructions from the application server 108 and obtain, update, or otherwise process data, instructions, or other such information in response thereto. In one example, a user might submit a search request for a certain type of item. In this case, components of the data plane might access the user information to verify the identity of the user, and access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for various content providers or other such entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. The electronic environment in such cases might include additional components and/or other arrangements, such as those illustrated in the configuration 200 of FIG. 2, discussed in detail below.

Figure 2:
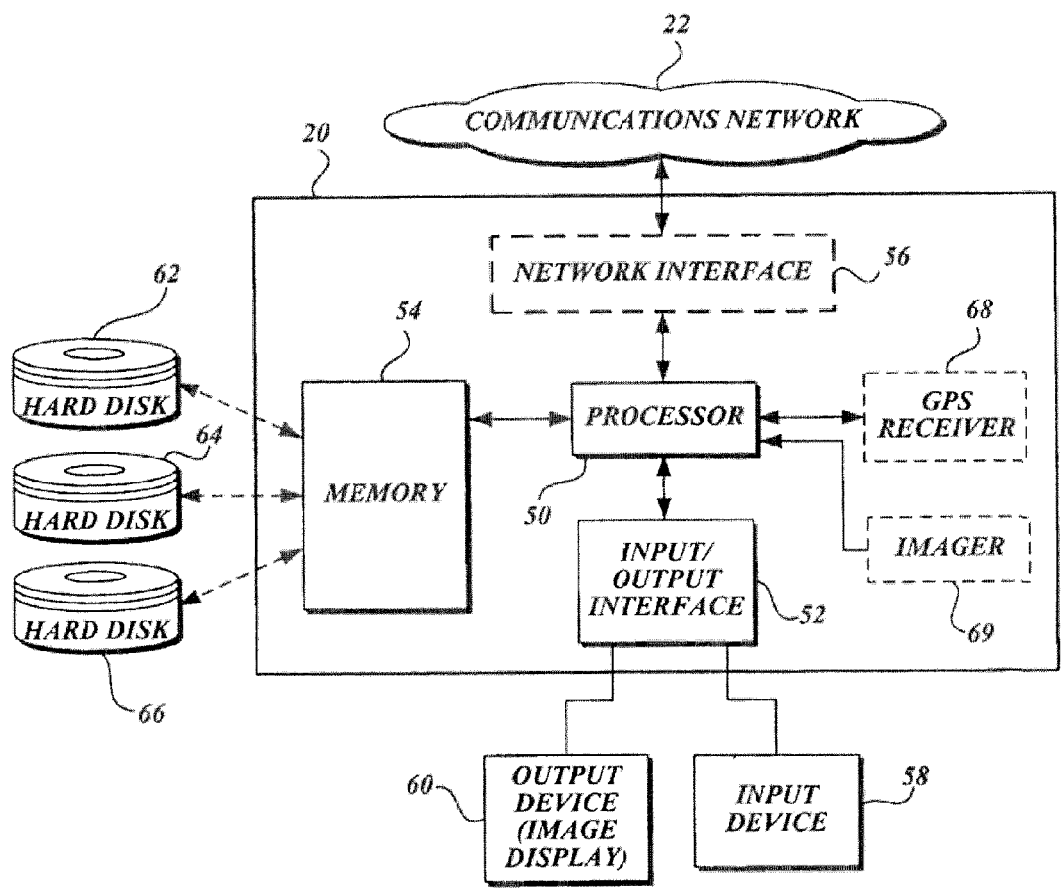
FIG. 2 is a diagram illustrating an exemplary configuration of a mobile device that can be used in verifying ownership of content in accordance with one embodiment.

FIG. 2 illustrates an exemplary configuration of a mobile device 20 suitable for use in verifying ownership of content. In various exemplary embodiments of the present invention, a mobile device 20 may be any device that communicates with a chosen wireless communications network 22, such as cellular phones, personal digital assistants (PDAs), mobile computer communicators, such as Blackberry® devices, portable (mobile) computers, such as laptop computers, Webpads, tablets, and other computing devices having some type of memory, etc. In the illustrated embodiment, the mobile device 20 includes a processor 50 in communication with an input/output interface 52, a memory 54, and a network interface 56 for interfacing with the wireless communications network 22. The input/output interface 52 enables the processor 50 to communicate with various input and output devices. Input devices 58 may include any computing elements that provide input signals to the processor 50, such as a keyboard, a mouse, a speech recognition application, such as Microsoft® Speech.NET™ application, etc. Output devices 60 may include typical output devices, in particular a screen display. The processor 50 is configured to operate in accordance with computer program instructions stored in a memory, such as the memory 54.

Also illustrated in FIG. 2, the mobile device 20 can include a camera module 69. The camera module 69 can be configured to capture digital images of items, such as books, discs, packages, or other physical items. Images captured by the camera module 69 can be transmitted over the communications network 22.

In accordance with various embodiments, a position or location of the mobile device 20 can be determined by a position identification system 68. In the present description, the term "position identification system" is used to refer to any system that is capable of identifying the geographic position of the mobile device 20 so as to permit selection of location-specific images for display based on the determined position. The position identification system may utilize device-based technologies, i.e., technologies that permit the mobile device 20 to self-identify its position. An example of using such technologies is to equip the mobile device 20 with a global positioning system (GPS) receiver 68, as shown in FIG. 2. Alternatively, the position identification system may utilize network-based technologies, wherein the position of the mobile device 20 is identified based on a communication link connecting the mobile device 20 and the mobile image system 10 over the wireless communications network 22. For example, certain cellular phone systems track the strength, the angle, and the arrival time difference of transmission signals for determining a cell phone's position, using time difference of arrival (TDOA) technology or timing advance (TA) location measurement technology. In this embodiment, the position of the mobile device 20 is identified by the overall wireless communications network 22, perhaps at its base station (not shown), and the identified position may be relayed to the mobile device 20 and/or the mobile image system 10 to select suitable location-specific images for display based on the identified position of the mobile device 20. Further alternatively, the position identification system may utilize a combination of both device-based technologies and network-based technologies.

Therefore, the determination of the position of the mobile device 20 may or may not be performed by the mobile device 20 itself. Specifically, if a particular embodiment of a position identification system is such that the mobile device 20 is configured to self-identify its position (e.g., using a GPS receiver), then the mobile device 20 is equipped with such a position identification system, and the position identification system, perhaps in conjunction with the processor 50 of the mobile device 20, will determine the position of the mobile device 20. The mobile device 20 (or, more specifically, its processor 50) will then carry out suitable instructions to select location-specific images for display based on the determined position of the mobile device 20. On the other hand, in another embodiment of the position identification system, the position of the mobile device 20 may be determined by the overall wireless communications network 22 (e.g., using TDOA technology) without having the mobile device 20 perform any particular functions other than being turned on and transmitting/receiving signals to/from the network 22. In such a case, the determined position of the mobile device 20 may or may not be relayed to the mobile device 20, and selection of suitable location-specific images based on the determined location of the mobile device 20 may be performed by the mobile device 20 and/or the mobile image system 10.

Those having ordinary skill in the art of computers will recognize that a wide selection of commercially available components and arrangements can be used to construct a system, such as the mobile device system 20 illustrated in FIG. 2.

Figure 3:
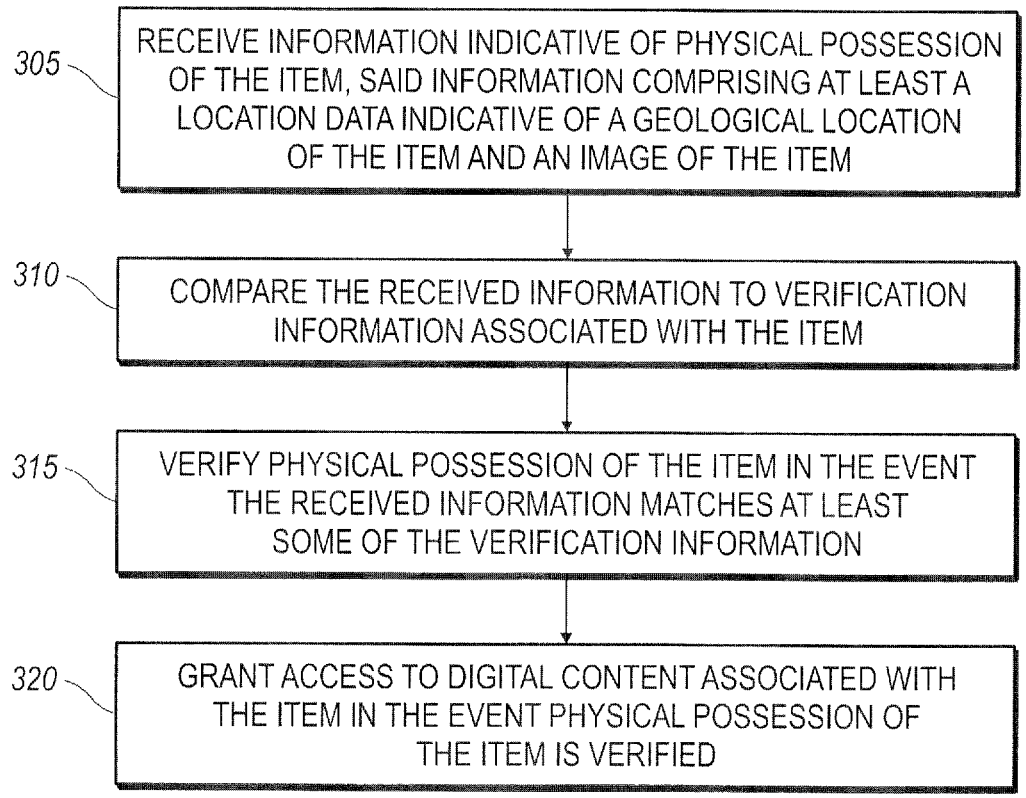
FIG. 3 is a flow diagram of one example method verifying ownership of content according to one embodiment and from the perspective of a device configured to grant access to digital content.

FIG. 3 illustrates a flow chart of a method of verifying ownership of content from the perspective of a device configured to grant access to digital content associated with items. In one example, the device configured to grant access to digital media can be a server-based device. The device requesting access to digital content can be a mobile device, such as the one illustrated in FIG. 2, as may include a laptop computer, an electronic tablet, or any other device which can transmit images and location data indicative of the location of the item and the device. The method 300 illustrated in FIG. 3 is provided by way of example, as there are a variety of ways to carry out the method. Additionally, while the exemplary method 300 is illustrated with a particular order of steps, those of ordinary skill in the art will appreciate that FIG. 3 and the steps illustrated therein can be executed in parallel (e.g., at the same time) or in any order that accomplishes the technical advantages of the present disclosure and can include fewer or more steps than illustrated.

Each block shown in FIG. 3 represents one or more processes, methods or subroutines, carried out in one example method 300. The steps illustrated in FIG. 3 can be implemented in a system including a first electronic device in communication with a second electronic device. Each block shown in FIG. 3 can be carried out by a processor communicatively coupled to the web server 106 and/or the application server 108 illustrated in FIG. 1. The flow chart illustrated in FIG. 3 will be described in relation to and make reference to a mobile device 500 and an item 550, which is a book, illustrated in FIG. 5. The method 300 will be described in regard to an item that is a book 500, but those of ordinary skill in the art will appreciate that the item can be any other item for which a digital copy exists or any other item which can have associated digital content.

The method 300 of verifying ownership of content can begin at block 305. At block 305, information indicative of a physical possession of a book 500 can be received. The information can include at least a location data indicative of a geographic location of the item and an image of the item. For example, the location data can be the GPS coordinates of the device 500 from which the information is received. In other words, the geographic location of the item can be inferred from the geographic location of the device 500. The image 505 can be of a cover 560 of the book, a spine 555 of the book, a portion of the cover 560, a portion of the spine 555, or any other portion of the book 550 that provides an indication as to which digital content is being requested. After the information indicative of the physical position of a book is received, the method 300 can proceed to block 310.

At block 310, the received information can be compared to verification information associated with the book 550. The received information is indicative of a request for access to digital content associated with the book 550. For example, verification information can include portions of the digital content associated with the item (for example, pages of a digital copy of a book), a location database comprising location data associated with prohibited locations, a database of customer information (such as mailing or shipping addresses of customers), or any other information which can be used in verifying the ownership of an item. The verification information can be stored in a memory device, such as a server-database, a remote database, or other storage device communicatively coupled to the device configured for verifying ownership of content.

In one example, the information indicative of physical possession of the item includes an image 505, taken and transmitted by a mobile device 500, of the title on the cover 560 of the book 550 and the GPS coordinates of current location of the mobile device 500. The image 505 can be compared to the cover of the digital version of the book 550. If the image received from the mobile device 500 matches the cover of the digital version of the book 550, a determination can be made that physical possession of the book 550 is verified. If however, the images do not match, physical possession of the book 550 is not verified. In various embodiments, comparing the received information to verification information associated with the book 550 may include performing one or more machine recognition techniques to determine whether the image 505 matches the verification information. For instance, the method may include performing optical character recognition (OCR) on the image 505 to identify text that matches the verification information. In some embodiments, performing the machine recognition techniques may include performing image recognition techniques (e.g., object, pattern, or color recognition techniques) in order to determine whether the image 505 matches the verification information (which may comprise one or more images of the book 550).

In another embodiment, a request can be made, to the mobile device 500, for supplemental information associated with the book 550 shown in the image 505. The request for supplemental information can be provided as a pop-up display, a pop-up request, a text message, or other notification presented or rendered by the mobile device 500 (e.g., displayed on a display of the mobile device 500 or played as audio via a speaker associated with the mobile device 500). For example, the request for the supplemental information can include a request for additional images of the book 550. The additional images can be of a back cover 575 of the book 550, one or more interior pages 565, 570 of the book, portions of interior pages 565, 570 of the book, paragraphs or passages of interior pages 565, 570 of the book, a barcode or optical code 580 printed on the back of a book, or an image of the book 550 taken at a specified predetermined orientation (for example, an image of the book 550 taken such that the spine 555 of the book and the title on the cover 560 of the book 550 are visible, an image of the book 550 taken from an angle of 45 degrees with respect to top edge of the book 550, or any other orientation which provides perspective to the book and demonstrates that the book 550 is a physical object).

In one example, where the supplemental information includes interior pages 565, 570 of the book 550, the device configured for granting access to digital content associated with the book 550 can randomly select which interior pages to request each time a request for digital content is made. For example, a first device can request access to digital content and can be required to provide images of two interior pages of the book 550 as supplemental information. A second device can request access to the same digital content and can also be required to provide images of two interior pages of the book 550 as supplemental information, but the two interior pages requested can be different from the requested interior pages provided by the first device. By randomly or pseudo randomly selecting which interior pages to request can increase a confidence that the physical item captured in the images provided by the mobile device 550 are of a physical item and can increase the confidence that the use of the mobile device 500 has physical possession of the item.

In yet another example, the types of supplemental information can vary with each request for access to digital content. For example, a first device requesting access to digital content associated with a physical item can be requested to provide for a first set of supplemental information, and a second device requesting access to digital content associated with a physical item can be requested to provide a second set of supplemental information that is different from the first set. Such varying supplemental information ensures the validity of physical possession of an item.

Comparing the received information to the verification information associated with the book 550 can include verifying the current location of the mobile device 500 is not in a prohibited location. Prohibited locations can include a bookstore, a music store, a retail store, a movie theater, a library or any other location where ownership of a physical item can be feigned or faked. At block 310, the location data receive from the device (for example the GPS coordinates) can be compared to a location database, a customer database, or any other database containing location data. The location database can include location data corresponding to the locations of bookstores, music stores, retail stores, movie theatres, libraries, or other prohibited locations. For example, the location data of the mobile device 500 can be compared to location data stored in the location database to determine if the location data of the mobile device 500 matches an address of a bookstore, music store, retail store, movie theatre, library, or other address associated with a prohibited location stored in the location database. In another example, the location data of the mobile device 500 can be compared to location data stored in a customer database to determine if the location data of the mobile device 500 matches an address that matches a shipping address of the mobile device (that is, the address where the user of the mobile device 500 receives packages and items purchased online); differs from location data associated with prohibited locations; or matches location data that has been identified as a non-prohibited location. Based on the comparisons made at block 310, the method 300 can proceed to block 315. In certain embodiments, the prohibited and non-prohibited locations may be provided or specified by an owner of the digital content associated with the items or an operator of the system that grants access to the digital content associated with the items.

At block 315, physical possession of the item can be verified if the information, received from the mobile device, matches, by a matching threshold, at least some of the verification data or information. For example, where the information received from the mobile device are images, physical possession and ownership of the item can be verified if the images match, by a matching threshold, corresponding images of the verification data. The matching threshold can be: a percentage of the content in the images received from the mobile device that match content of images of the verification data; a number of images received from the mobile device that match content in the verification data; a percentage of information received from the mobile device that matches the verification data; a percentage of information received from the mobile device that is identical to the verification data; a percentage of information received from the mobile device that is similar to the verification data; or any other threshold that can indicate that the information received from the mobile device is the same or at least similar to the verification data. The matching threshold may be specified by an owner of the digital content associated with the items or an operator of the system that grants access to the digital content associated with the items. Additionally, physical possession of the item can be verified if the current location of the mobile device 500 does not match at least one prohibited location. That is, physical possession of the item can be verified if the current location of the mobile device 500 is associated with a non-prohibited location.

In another example, verification of physical possession of the item can include comparing at least one of a date stamp or time stamp of the images transmitted from the mobile device 500 to the date or time of the request for access to digital content. If the date and time stamps of the images indicate that the images were captured contemporaneously with the request for access to the content, physical possession of the item and ownership of the content therein is verified. Similarly, if the date and time stamps of the images indicate that the images were captured concurrently or substantially simultaneously with the date or time of the request for access to digital content, ownership of the content contained in the item can be verified. That is, if the date and time stamps of the images are within a predetermined timing threshold of the date or time of the request for access to digital content, ownership of the content contained in the item can be verified. For example, if the date and time stamps of the images are within thirty seconds, one minute, five minutes, ten minutes, or within any other predetermined timing threshold of (including at the same time as) the time and/or date of the request for access to digital content, ownership of the content contained in the item can be verified. In another embodiment, if the date and time stamps of the images are after (or more recent than) the date or time of the request for access to digital content, physical possession and ownership of the content therein is verified. If however, the date and time stamps are older than the date or time of the request for access to digital content, physical possession and ownership of the item may not be verified. In such an instance, supplemental information associated with the item 550 can be requested. After the physical possession of the item (for example book 550) is verified, the method can proceed to block 320.

At block 320, access to the digital content associated with the item 550 can be granted, in the event physical possession of the item is verified. Access to digital content can include transmitting a digital copy of the item 550 to the mobile device 500, enabling access to a virtual library that includes the digital copy of the item 550, providing the mobile device 500 with digital rights to the item 550, appending a list of customers with digital rights to the item 550 to include a name of owner or user of the mobile device 500, or any other type of access to the digital copy of the item 550. In one embodiment, the granted access to digital content can be temporary or permanent. For example, a subscription period to the digital content may be granted, where the user can be required to re-verify physical possession or ownership of the item after the subscription period has expired. As access to the digital content is granted upon verifying physical possession or ownership of the physical item, customers are not required to purchase an additional or separate digital copy of the item.

Figure 4:
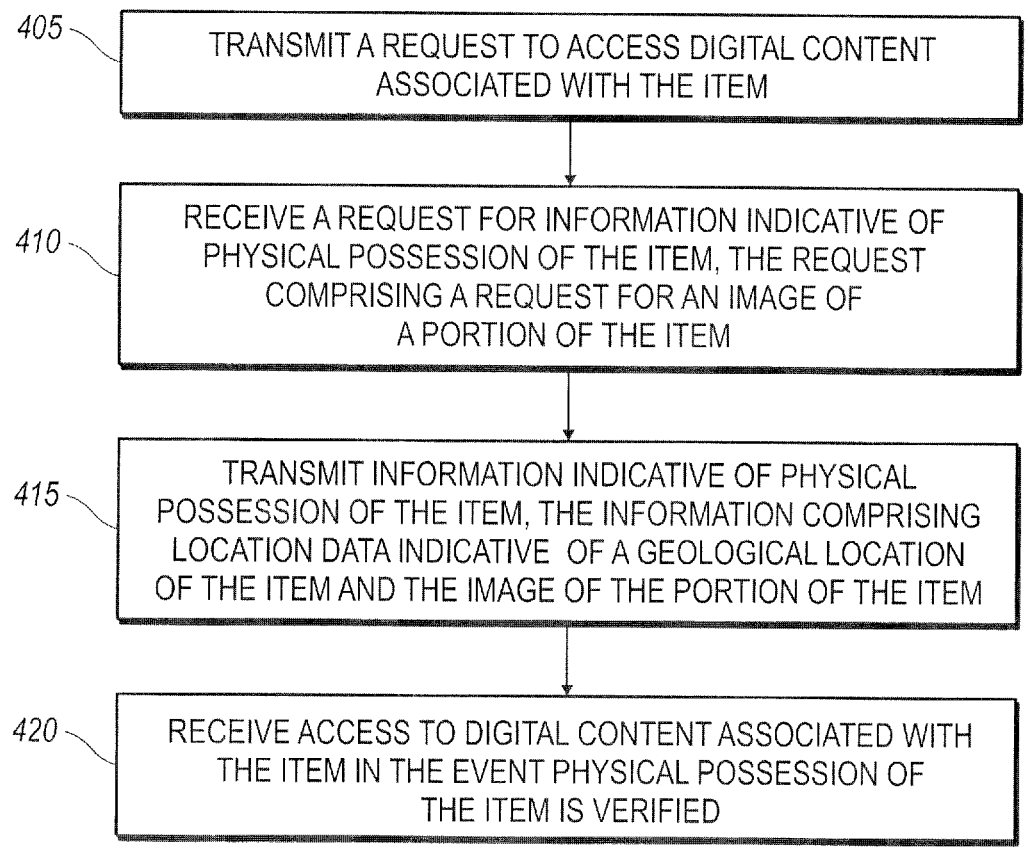
FIG. 4 is a flow diagram of one example method verifying ownership of content according to one embodiment and from the perspective of a device requesting access to digital content.
Figure 5:
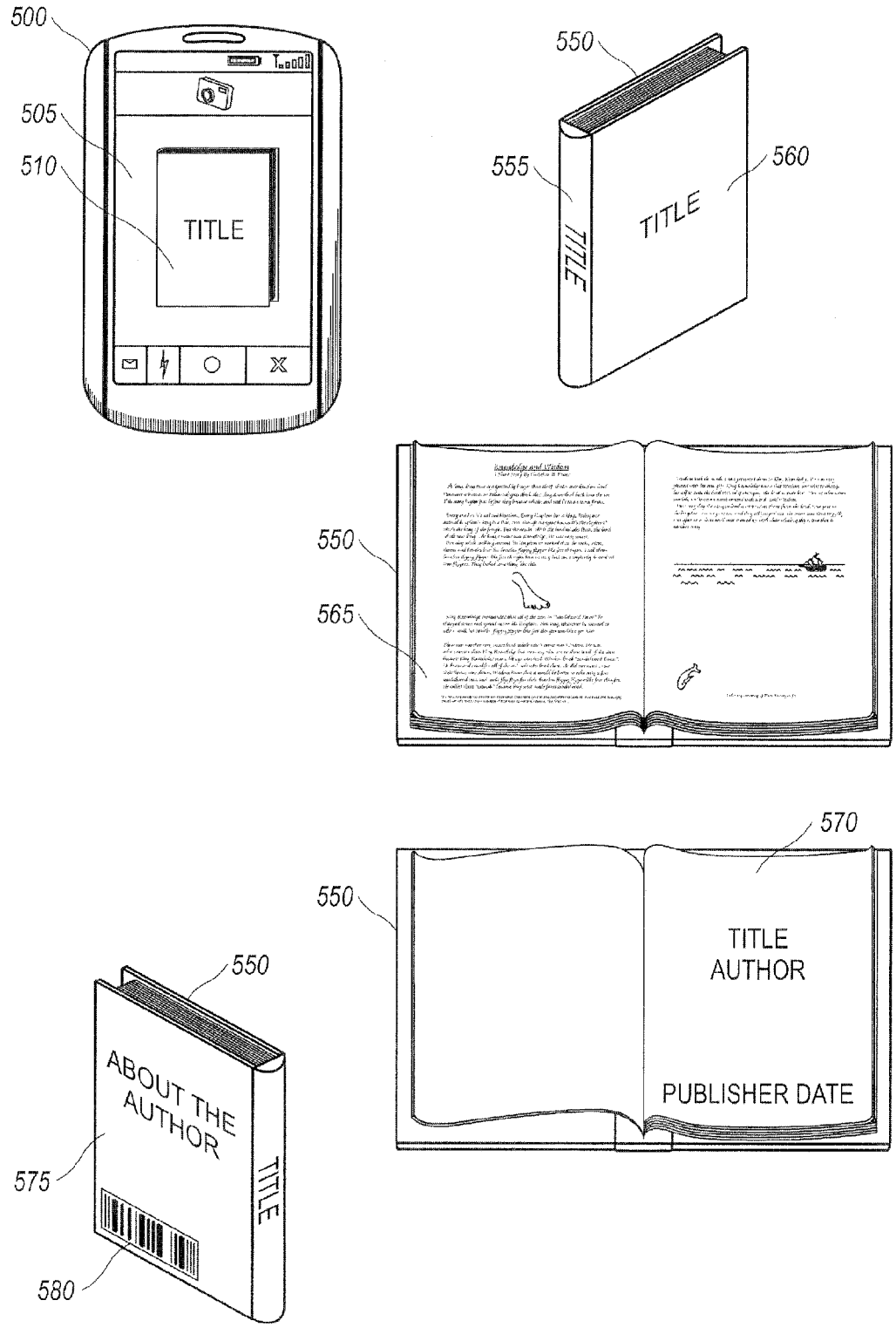
FIG. 5 is an illustration of verifying ownership of content that is a book according to one embodiment.

FIG. 4 illustrates a flow chart of a method of verifying ownership of content from the perspective of a device requesting access to the digital content. In one example, the device requesting access to digital content can be a mobile device, such as the one illustrated in FIG. 2, as may include a laptop computer, an electronic tablet, or any other device which can transmit images and location data indicative of the location of the item and the device. The method 400 illustrated in FIG. 4 is provided by way of example, as there are a variety of ways to carry out the method. The method 400 can be carried out by the processor 50 of a mobile device 20 illustrated in FIG. 2. The method of FIG. 4 will be discussed in reference to an item that is a book 550 and a mobile device 400, as illustrated in FIG. 5.

The method 400 can begin at block 405 where the mobile device 500 can transmit a request to access digital content associated with a book 550. In one example, the mobile device 500 can transmit the request via a web application, a phone application, a website, or other application. The mobile device 500 can transmit the request to a server-database, a web server, a web-based server, a server, or any other device which is configured to grant access to digital content associated with the item 550. The request can be an indication that the user of the mobile device is requesting access to the digital content. For example, the request can be a signal or data indicative of an initiation of an application associated with requesting content to digital content. In another example, the request can be a selection of an icon, button, or other user-selectable item which when selected can indicate the user of the mobile device is requesting access to digital content. In the example illustrated herein, the request transmitted by the mobile device 500 can include an image of a portion of the item (for example, a title of the cover 560 of the book 550). By transmitting an image of the title of the book 550, the device configured to grant access to digital content can determine what content the mobile device 500 is specifically requesting access to and can determine what verification data associated with the content is necessary for granting access thereto.

At block 410, the mobile device 500 can receive a request for information indicative of physical possession of the item. The requested information can comprise a request for an image of a specified portion of the item 550, which can be inferred from the geographic location of the mobile device 500. For example, the requested image can be an image of a back cover 575 of the book 550, one or more interior pages 565, 570 of the book, portions of interior pages 565, 570 of the book, paragraphs or passages of interior pages 565, 570 of the book, a barcode 580 printed on the back of a book, or an image of the book 550 taken at a specified predetermined orientation (for example, an image of the book 550 taken such that the spine 555 of the book and the title on the cover 560 of the book 550 are visible, an image of the book 550 taken from an angle of 45 degrees with respect to top edge of the book 550, or any other orientation which provides perspective to the book and demonstrates that the book 550 is a physical object). In another embodiment, the request for information can include a request for the current location of the mobile device 500 to verify that the mobile device is not located in a prohibited location where ownership of the item 550 can be feigned. After receiving the request for information, the method 400 can proceed to block 415.

At block 415, the mobile device 500 can transmit the requested information indicative of the physical possession of the item 550. The mobile device 500 can also transmit location data indicative of the geographic location of the item 550. The geographic location of the item can be the same as the geographic location of the mobile device 500 as the mobile device 500 captures images of the item 550. The location data can be transmitted automatically with the requested information or can be specified for transmission by the user of the mobile device 500. In another embodiment, the location of the mobile device 500 can be transmitted in a request from the device configured to grant access to the digital content associated with the item 550. After transmitting the requested information, the method can proceed to block 420.

At block 420, the mobile device 500 can receive access to the digital content associated with the item 550, in the event physical possession of the item is verified. As discussed above in relation to FIG. 3, verification of the physical possession of the item can be based at least in part on the current location of the mobile device 500 and images, transmitted by the mobile 500, of the item 550. For example, the access to the digital content can include receiving permission to download a digital copy of the book 550 onto the mobile device, being granted access to a virtual library (for example a cloud library, a cloud storage, a web-based library, or other virtual library) comprising the digital copy of the book 550. As discussed above, the mobile device's 500 access to the digital content can be temporary or permanent.

While the method 400 is illustrated with a particular order of steps, those of ordinary skill in the art will appreciate that FIG. 4 and the steps illustrated therein can be executed in parallel (e.g., at the same time) or in any order that accomplishes the technical advantages of the present disclosure and can include fewer or more steps than illustrated.

FIG. 5 is an illustration of a mobile device 500 configured to request access to digital content associated with a physical item. In FIG. 5, the mobile device 500 includes a display 510 configured to display images captured by a camera (not shown) of the mobile device 500. In FIG. 5, the physical item is a book 550 having a cover 560, a spine 555, and a back cover 575. Various portions of the book 550 can be captured in an image and transmitted with the request for access to digital content to verify physical possession and ownership of the book 550. As shown in FIG. 5, an interior portion (for example, an page 565 of the book 550, a title page 570, or any other page of the book 550), a spine 555, a cover 560, and a back cover 575 of the book 550, or a portion thereof (for example, the barcode 580 on the back cover 575, a passage of a page 565 of the book, the publication information on the title page 570, or any other portion) can be captured in an image.

Figure 6:
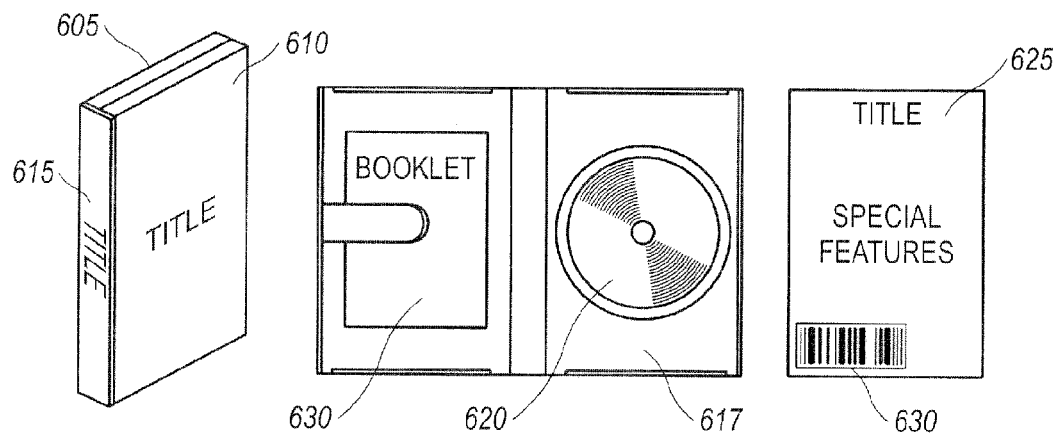
FIG. 6 is an illustration of various media for which digital access can be granted upon verifying ownership thereof according one embodiment.
Figure 6:
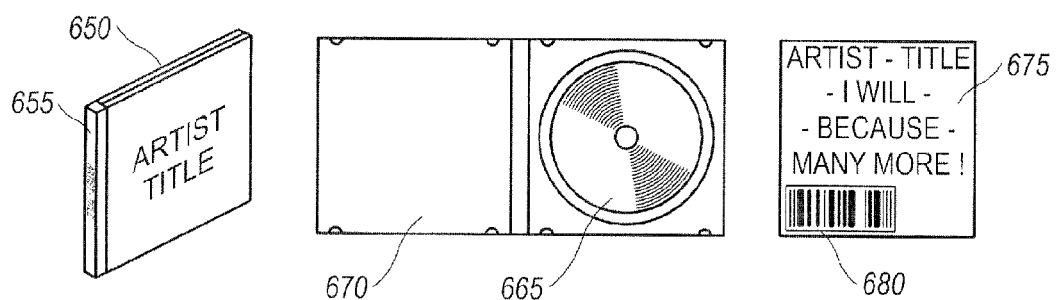
Figure 6:
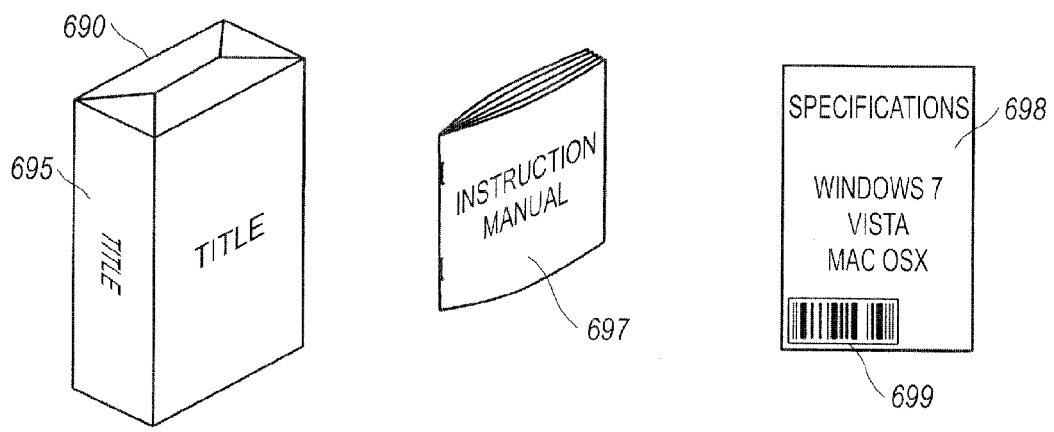

FIG. 6 is an illustration of other items which can have associated digital content to which a mobile device 500 user can request access upon verifying ownership thereof. FIG. 6 illustrates a movie or video disc 620 (for example, a digital video disc (DVD) of which images can be captured to verify ownership thereof. For example, images of the spine 615 of the DVD case, cover 610 of the DVD case, an interior 617 of the DVD case, the DVD 620 itself, a back cover 625 of the case, a barcode 630 imprinted on the DVD case, a booklet 630 (and any portion or interior pages thereof) accompanying the DVD 620, or any other portion of the DVD and DVD case that can indicate physical possession of the item. In another example, the images can be captured of scenes of the movie shown on a display (such as a TV screen, a laptop screen or other screen) to verify ownership of the movie of video disc 620. For example, a request can be transmitted to the mobile device 500 to capture an image corresponding to at least one specific scene or frame of a movie (for example, by indicating a time stamp of the movie, a chapter number and scene number of a movie, or other marker identifying a specific scene of a movie). The mobile device 500 can then capture the image corresponding to the specified scene or frame of the movie, and ownership of the movie disc or video disc 620 can be verified.

FIG. 6 also illustrates a music disc 665 (for example, a compact disc (CD) of which images can be captured to verify ownership thereof. For example, images of the spine 655 of the CD case, a front cover 660 of the CD case, an interior 670 of the CD case, the CD 665 itself, a back cover 675 of the case, a barcode 680 associated with the CD, a booklet (not shown) (and any portion or interior page thereof) accompanying the CD 665, or any other portion of the CD and CD case that can indicate physical possession of the item.

FIG. 6 also illustrates a software disc and packaging 690 of which images can be captured to verify ownership thereof. For example, images of the any portion of the packaging 695 in which the software disc was purchased, any portion or page of the instruction manual 697 accompanying the software disc, the software disc (not shown) itself, a back cover 698 of the packaging 690, a barcode 699 imprinted on the packaging 695, a product key imprinted in the instruction manual 697, or any other portion of the software disc and packaging that can indicate physical possession of the item.

Figure 7:
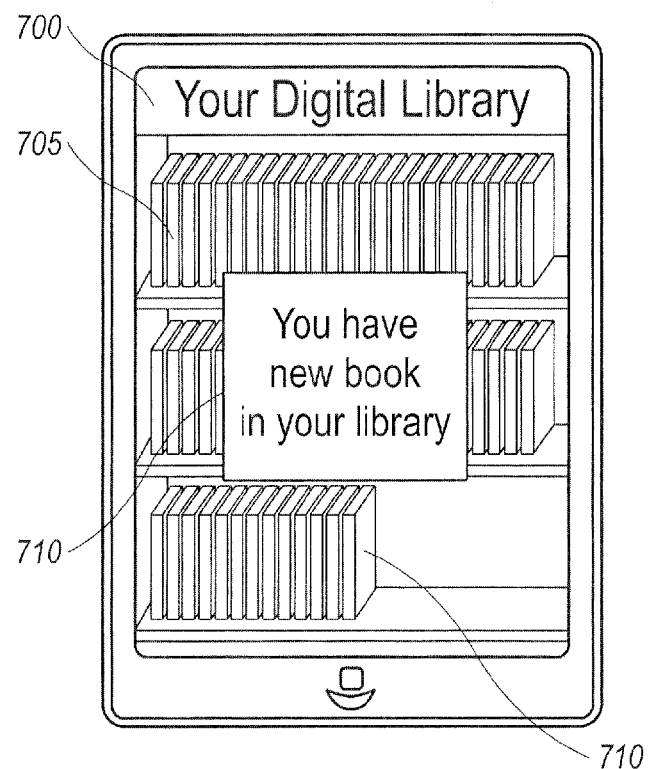
FIG. 7 is an illustration of a digital library of books accessible by a mobile device in accordance with one embodiment.

FIG. 7 is an illustration of granted access to digital content received on the mobile device 500. In FIG. 7, the physical possession and ownership of a book 550 has been verified, and the mobile device 500 has been granted access to a digital copy of the book 550. In FIG. 7, upon launching a digital library application on the mobile device 500, a graphical user interface depicting a virtual library 700 can be displayed on the display of the device 500. As shown in FIG. 7, the virtual library comprises a plurality of virtual books 705. A notification 715 (here a pop-up notification) is displayed overlaid on the virtual library 700 to notify the user that the digital copy of the book 550 the user possess has been added to the virtual library 700. Specifically in FIG. 7, the notification 715 notifies the user that "You have 1 new book in your library." The new virtual book 710 which corresponds to the book 550 which the user of the mobile device 500 physically possess and owns can be displayed as a last book on a shelf of the virtual library 700, thereby indicating that it was the most recently added book. However, those of ordinary skill in the art will appreciate that the virtual book 710 corresponding to the physical book 550 owned by the user of the mobile device 500 can be placed anywhere in the virtual library.

Figure 8:
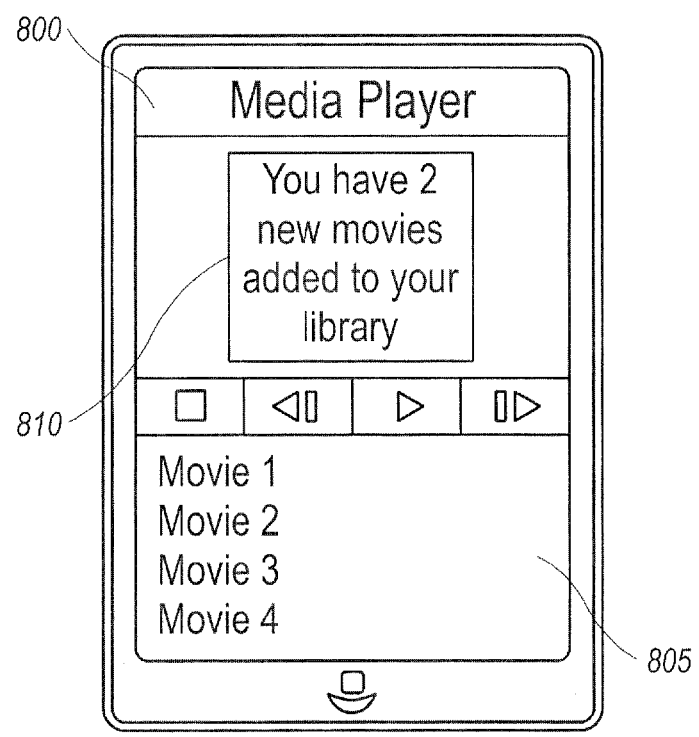
FIG. 8 is an illustration of a digital library of music accessible by a mobile device in accordance with one embodiment.

FIG. 8 is an illustration of granted access to digital content associated with two physical items possessed and owned by the user of the mobile device 500. In FIG. 8, the two physical items are movie discs. In FIG. 8, upon launching a digital media player application 800 on the mobile device 500, a graphical user interface depicting a virtual music library 805 can be displayed on the display of the device 500. As shown in FIG. 8, the virtual library comprises a plurality of movie files (not labeled). A notification 810 (here, a pop-up notification) is displayed overlaid on the virtual library 700 to notify the user that the digital copy of the book 550 the user possess has been added to the virtual library 700. Specifically in FIG. 8, the notification 810 notifies the user that "You have 2 new movies added to your library."

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure may be provided as a computer program product including a nontransitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for granting access to digital content, the method comprising:
receiving, from a first device, a first image of a first portion of an item;
determining a current location of the first device;
comparing the current location of the first device to a plurality of locations in at least one database, the plurality of locations including a plurality of prohibited geographic locations and a plurality of non-prohibited geographic locations, wherein the at least one database includes a location database including the plurality of prohibited geographic locations and a customer database including the plurality of non-prohibited geographic locations;
determining that the current location corresponds to a non-prohibited geographic location from the customer database, from which one or more physical copies of the item is accessible;
retrieving verification data associated with the item based at least in part on the received first image;
sending, to the first device, a request for a second image of a different portion of the item;
receiving, from the first device and in response to the request, the second image of the different portion of the item;
determining that at least a portion of the second image represents the verification data associated with the item;

determining that the second image was captured subsequent to, and contemporaneous with, the request; and
granting, to the first device, access to a digital version of the item.

2. The computer-implemented method of claim 1, wherein sending the request for the second image comprises transmitting to the first device a randomly selected portion of the item.

3. The computer-implemented method of claim 1, wherein the item comprises a book, and the different portion of the item comprises a randomly selected page of the book.

4. The computer-implemented method of claim 1, wherein the one or more prohibited locations comprise one or more locations corresponding to one or more libraries, bookstores, music stores, or retail stores.

5. The computer-implemented method of claim 1, wherein:
the item comprises a book; and
the second image comprises at least one of: a cover of the book, a title page of the book, at least two pages of the book, a barcode of the book, and a spine of the book.

6. The computer-implemented method of claim 1, wherein the item comprises a music disc, a movie disc, or a software disc.

7. The computer-implemented method of claim 1, wherein granting access to the digital version of the item is temporary.

8. The computer-implemented method of claim 1, wherein granting access to the digital version of the item comprises initiating a subscription to the digital content.

9. The computer-implemented method of claim 1, wherein sending, to the first device, a request for a second image of a different portion of the item comprises:
selecting, at random, from at least one memory device communicatively coupled to one or more computer systems, at least one piece of verification information, wherein the request for supplemental information comprises requesting an image corresponding to the at least one piece of verification information.

10. The computer-implemented method of claim 1, further comprising:
determining whether the current location corresponds to a location corresponding to a library, a bookstore, a music store, or a retail store, wherein access to the digital content is granted in response to determining that the location data corresponds to a location different from the location corresponding to the library, the bookstore, the music store, or the retail store.

11. The computer-implemented method of claim 1, further comprising:
determining whether the current location corresponds to a location corresponding to a library, a music store, a retail store, or a movie theater; and
denying access to digital content associated with the item in response to a determination that the current location corresponds to a location that corresponds to a library, music store, a retail store, or a movie theater.

12. The computer-implemented method of claim 1, wherein determining that at least a portion of the second image represents the verification data associated with the item comprises determining whether location data indicative of a geographic location of the item corresponds to a customer address stored in at least one memory device communicatively coupled to one or more computer systems configured with executable instructions.

13. A system for verifying ownership of content, the system comprising:
a processor; and
a memory device including instructions that, when executed by the processor, cause the processor to:
receive, from a first device, a first image of a first portion of an item;
determine a current location of the first device;
compare the current location of the first device to a plurality of locations in at least one database, the plurality of locations including a plurality of prohibited geographic locations and a plurality of non-prohibited geographic locations, wherein the at least one database includes a location database including the plurality of prohibited geographic locations and a customer database including the plurality of non-prohibited geographic locations;
determine that the current location corresponds to a non-prohibited geographic location from the customer database, from which one or more physical copies of the item is accessible;
retrieve verification data associated with the item based at least in part on the received first image;
send, to the first device, a request for a second image of a different portion of the item;
receive, from the first device and in response to the request, the second image of the different portion of the item;
determine that at least a portion of the second image represents the verification data associated with the item;
determine that the second image was captured subsequent to, and contemporaneous with, the request; and
grant, to the first device, access to a digital version of the item.

14. The system of claim 13, wherein:
the item comprises a book; and
the second image of the item comprises an image of at least one of: a cover of the book, a title page of the book, at least two pages of the book, a barcode of the book, and a spine of the book.

15. The system of claim 13, wherein the memory device further includes instructions that, when executed by the processor, cause the processor to:
determine whether the location data corresponds to a location corresponding to a library, a music store, a retail store, or a movie theater; and
deny access to digital content associated with the item in response to a determination that the location data corresponds to a location corresponding to a library, music store, a retail store, or a movie theater.

16. A non-transitory computer-readable storage medium for verifying ownership of content, the non-transitory computer-readable storage medium including instructions that, when executed by at least one computing device, cause the at least one computing device to:
transmit a request to access digital content associated with an item;
receive a request for information indicative of physical possession of the item, the request comprising a request for an image of a portion of the item;
transmit information indicative of physical possession of the item, the information comprising location data indicative of a geographic location of the item and the image of the portion of the item;
wherein the location data is compared to a plurality of locations in at least one database, the plurality of locations including a plurality of prohibited geographic locations and a plurality of non-prohibited geographic locations, wherein the at least one database includes a location database including the plurality of prohibited geographic locations and a customer database including the plurality of non-prohibited geographic locations;
cause physical possession of the item to be verified based upon the image of the portion of the item and a determination that the location of the device corresponds to a non-prohibited geographic location from the customer database, from which one or more physical copies of the item is accessible, based on a comparison of the geographic location of the item to the plurality of locations in at least one database; and wherein verification data associated with the item is retrieved based at least in part on the received first image;

receive a request for a second image of a different portion of the item;

transmit the second image of the different portion of the item, wherein at least a portion of the second image is determined to represents the verification data associated with the item, and that the second image was captured subsequent to, and contemporaneous with, the request; and receive access to digital content associated with the item in the event physical possession of the item is verified.

17. The non-transitory computer-readable storage medium of claim 16, wherein the instructions that, when executed by at least one computing device, cause the at least one computing device to transmit a request to access digital content and transmit an image of an exterior portion of the item.

18. The non-transitory computer-readable storage medium of claim 16, wherein the second image comprises an image of at least one randomly-selected interior portion of the item.

19. A device comprising:
a processor;
a communication module;
a camera module;
a location detector: and
a memory device including instructions that, when executed by the processor, cause the processor to:

cause the camera module to capture first image of an item;

cause the communication module to transmit, to a verification system, a request for digital content associated with the item, wherein the request includes the first image of the item;

cause the communication module to receive a request for a second image of the item;

cause the camera module to capture the second image of the item;

cause the communication module to transmit the second image of the item to the verification system; and receive access to digital content associated with the item, in the event that the verification system (1) verifies physical possession of the item based on the image of the item and the second image of the item and (2) determines that the location of the device corresponds to a non-prohibited geographic location from a customer database, from which one or more physical copies of the item is accessible, based on a comparison of the geographic location of the item to a plurality of locations in at least one database, wherein the location data is compared to a plurality of locations in at least one database, the plurality of locations including a plurality of prohibited geographic locations and a plurality of non-prohibited geographic locations, wherein the at least one database includes a location database including the plurality of prohibited geographic locations and a customer database including the plurality of non-prohibited geographic locations.

20. The device of claim 19, wherein the request for the second image of the item includes a request for a predetermined orientation of the different image of item.

* * * * *